Jan. 28, 1941. J. W. BRYCE 2,230,129
ACCOUNTING MACHINE
Filed May 6, 1936 5 Sheets-Sheet 1
FIG.1a.

Jan. 28, 1941.  J. W. BRYCE  2,230,129
ACCOUNTING MACHINE
Filed May 6, 1936   5 Sheets-Sheet 4

INVENTOR
James W. Bryce
BY
ATTORNEY

Jan. 28, 1941.   J. W. BRYCE   2,230,129
ACCOUNTING MACHINE
Filed May 6, 1936   5 Sheets-Sheet 5

INVENTOR
James W. Bryce
BY
ATTORNEY

Patented Jan. 28, 1941

2,230,129

UNITED STATES PATENT OFFICE 2,230,129

ACCOUNTING MACHINE

James W. Bryce, Glen Ridge, N. J., assignor to International Business Machines Corporation, New York, N. Y., a corporation of New York Application May 6, 1936, Serial No. 78,102

9 Claims. (Cl. 235—61.7)

This case relates to card-controlled accounting machines or tabulators.

The general object is to control accounting operation or tabulation of data by the machine according to a comparison of different values.

Further, an object is to compare the data of different data designating fields or portions of a record card for comparative value, size or relative magnitude to selectively determine accounting operations.

More specifically, the object is to effect different operations of the accounting machine depending on whether one value is greater than, less than, or equal to another value.

An object is, also, to compare different values in order to determine which of several accounting instrumentalities is to be controlled by data on a record card.

Still further, the object is to route an entry to one of several entry-receiving devices in accordance with a selection made by comparing different values.

Another object is to control recording operations in accordance with the relation of two control values.

A further object is to include an item derived from a record card in one printed list or another recorded by the machine, the selection of the list being made by a comparison of different values.

It is also an object to control total taking operations in accordance with a comparison of values.

More specifically, the latter object is to read out a total from one or another totaling device in accordance with which is selected by a value comparison.

Further, an object is to provide for comparing two values on a record card to determine the entry of other data from the record card into the accounting apparatus.

Still further, an object is to provide for comparing two values, both of which may be designated on a record card, or one of which may be set up externally of the record card, to determine which of several items on the record card is to be entered into the accounting apparatus.

Other objects will appear from the following parts of the specification and from the drawings, in which—

Fig. 1b is a continuation of Fig. 1a,

For purposes of the disclosure, the invention will be explained in connection with a tabulating machine such as disclosed in Patent No. 1,762,145. Only parts of the latter required for an understanding of the present invention will be described herein. Parts peculiar to the present invention may be referred to as special.

Briefly, the control or record card has parallel columns of index point positions to be perforated according to the single hole or Hollerith code to represent items or values. The positions of a card column from the bottom upward correspond to values 9, 8, 7—1, 0, 11 and 12. Several adjacent columns may constitute a multi-denominational order field. For example, a three order value will occupy a three column field. A single card column may also be referred to as an item or value bearing field.

The cards are arranged in groups, each group having a common classifying item or value and the cards are sent through the machine bottom first.

After placing a stack of several groups of cards in the machine, the operator depresses reset key R (Fig. 1a) to close reset key contacts R¹, forming the following circuit:

Circuit a—Manual reset

Figure 1A:
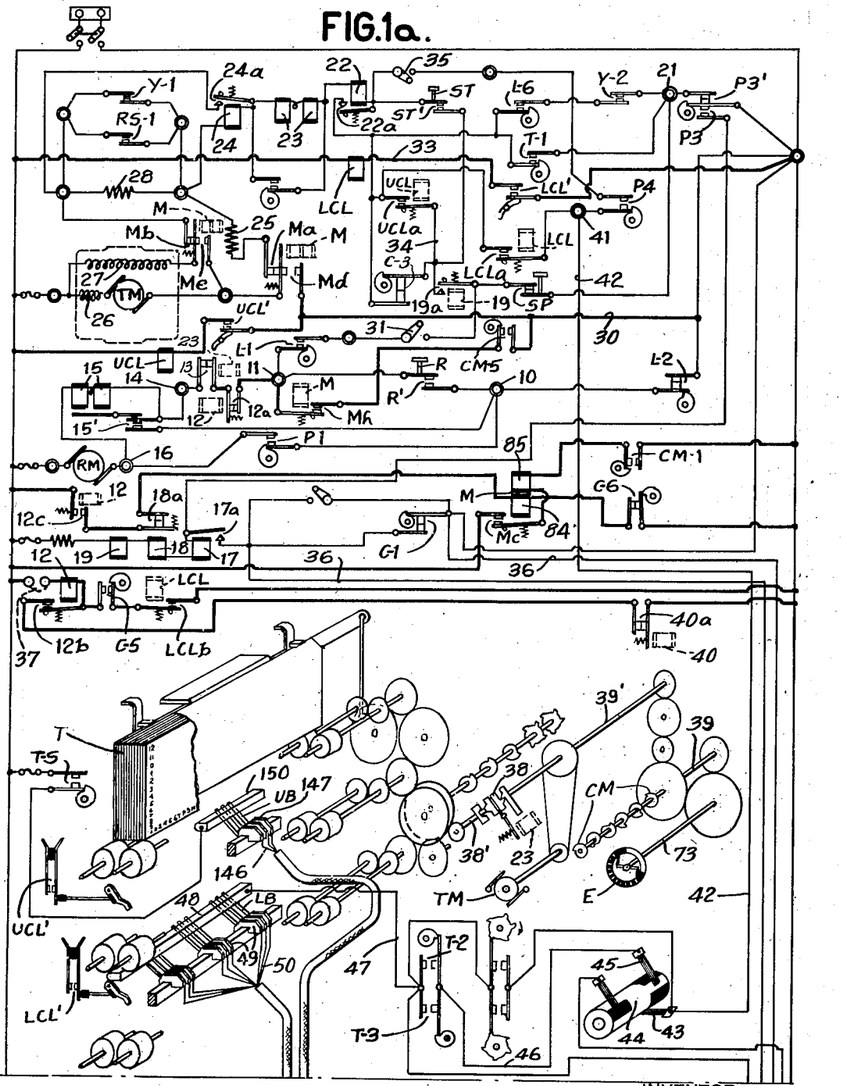
Fig. 1a is the upper part of the circuit diagram.

From the right side of the supply line, through cam contacts L2, terminal 10, reset key contacts R¹, terminal 11, normally closed special relay contacts 12a, contacts 13 (closed when the tabulating clutch is released), terminal 14, reset clutch magnet 15, terminal 16, reset motor RM, and to the left side of the line.

Reset clutch magnet 15, upon energization, closes contacts 15' to form a by-pass path around reset key contacts R' extending from terminal 14 to terminal 10. Then, when motor RM starts operating, cam contacts P1 close to form a shunt path for motor RM, extending from terminal 16 to terminal 10 and which shunts out reset magnet 15, causing contacts 15' to open. Near the end of the reset cycle, contacts P1 open and the reset cycle means coasts to a stop.

During the reset cycle, cam contacts P3 close to form the following circuit (Fig. 1a):

Circuit b—Tabulating control

From the right side of the line, through cam contacts P3, magnet 17, special magnet 18, magnet 19, and to left side of line.

Magnet 17 closes contacts 17a to by-pass contacts P3 through the following path:

Circuit path b—1

From contacts 17a, through cam contacts C—1, and to the right side of line.

After the reset cycle ends, the operator depresses start key ST to close start key contacts ST', forming the following circuit (Fig. 1a):

Circuit c—Manual tabulating initiation

From the right side of the line, through contacts P3', terminal 21, stop key contacts SP, contacts 19a (now closed by magnet 19), start key contacts ST', magnet 22, tabulating clutch magnet 23, magnet 24, resistance 25, special normally closed relay contacts Ma, the armature of tabulating motor TM, its series field 26 and to the left side of the line.

The starting current is strong enough to energize magnet 24 for closing contacts 24a to form the following circuit:

Circuit c—s—Shunt field of motor TM

Beginning as in circuit c, then continuing from contacts 24a, through special normally closed relay contacts Mb, through the shunt field 27, and to the left side of the line.

The motor starts at high torque and low speed, the conditions desired for a listing or item printing operation. When the current falls below the starting value, magnet 24 is not sufficiently energized to maintain contacts 24a closed, but then contacts RS—1 close (closed by the rock shaft of the printing mechanism, as disclosed in aforementioned Patent 1,762,145) to maintain a shunt around resistance 28. When the machine is set for listing or printing each tabulating cycle, then contacts Y—1 are continuously closed to also shunt out resistance 28. When contacts Y—1 and RS—1 are open and the machine is going through those tabulating cycles in which no printing operation occurs, then the circuit for shunt field 27 of motor TM goes through resistance 28 and the motor operates at high speed and low torque.

Circuit c energized relay 22 to close armature contacts 22a, thereby by-passing contacts ST', contacts 19a, and contacts SP to hold circuits c and c—s through either of parallel paths between terminal 21 and relay contacts 22a, the flirst path being through cam contacts T—1, and the second, alternative path being through cam contacts L—6 and contacts Y—2 constantly closed when the machine is set for straight listing. A third shunt path which makes before the first two and also breaks before the first two break, extends from terminal 21 through contacts SP, 19a, and cam contacts C—3 to relay contacts 22a. This third shunt path alternates with a fourth shunt path formed through upper card lever relay contacts UCLa, which are in shunt with contacts C—3. Contacts UCLa are closed when circuit d, traced below, is formed due to closing of upper card lever contacts UCL'. These contacts are closed by the card issuing from the supply magazine just before the card reaches the line of upper analyzing brushes UB, and the card maintains these contacts closed while feeding through the upper analyzing station and until the next card closes the contacts. During the first, manually initiated tabulating cycle, the shunt circuits through contacts L—6, T—1, and C—3 open (also during every other tabulating cycle) upon breaking of these contacts (see Fig. 4). Shunt path b—1 of magnets 17, 18, and 19 opens during the first tabulating cycle upon breaking of contacts C—1, deenergizing magnet 19 to permit contacts 19a in the fourth shunt path of magnets 22 and 23 to open. Hence, the closing of contacts UCL' near the end of the first tabulating cycle is without effect. Consequently, at the end of the first tabulating cycle, all the shunt paths for the tabulating clutch magnet and motor are open, and the machine stops tabulating operation. During this first tabulating cycle, the first record card T was fed to a position with its lowest or "9" index point position just behind the line of upper card analyzing, reading, or sensing brushes UB. The card also has just closed upper card lever contacts UCL'. Closing of contacts UCL' establishes the following circuit (Fig. 1a):

Circuit d—Upper card lever relay

From the right side of the line, through wire 30, contacts UCL', special relay coil UCL, and to the left side.

Tabulating clutch magnet 23 of circuits c and c—s, when energized, opens contacts 13 of reset circuit a. When circuits c and c—s break during the first tabulating cycle, tabulating clutch magnet 23 is deenergized, permitting contacts 13 (see circuit a) to close, and when tabulating cam contacts L1 close, the following circuit (Fig. 1a) is completed:

Circuit a—1—Auto reset initiation

From the right side of the line, through closed cam contacts P3', stop key contacts SP, auto reset switch 31 (closed), cam contacts L1, and from there on as in circuit a.

As a result, a second reset cycle occurs. During this reset cycle, circuit b is again formed and consequently contacts 19a reclose. The operator now depresses start key ST for the second time to reestablish circuits c and c—s, and the machine goes through a second tabulating cycle. During this second cycle, the first card is fed to the lower card reading brushes LB while the second card is fed to the upper brushes UB. The second card closes contacts UCL' to retain circuit d for energizing relay coil UCL while the first card closes lower card lever contacts LCL' to form the following circuit:

Circuit e—Lower card lever relay

From the right side of the line, through contacts LCL', line 33, special relay coil LCL, and to the left side.

During the second tabulating cycle, when cam contacts C—1 in circuit path b—1 open, there is no other path for the circuit, and magnet 19 is deenergized to permit its armature contacts 19a to open. When cam contacts T—1 or L6 open, circuits c and c—s also open and the tabulating motor stops. In the same way as after the first tabulating cycle, auto reset circuit a—1 is closed to initiate a reset cycle. This reset cycle in turn automatically initiates a third tabulating cycle as follows: During the reset cycle, cam contacts P3 close to establish circuit b through relay 19. Energization of the latter closes contacts 19a. Following this, cam contacts P3' and P4 close and now, with upper and lower card lever relay contacts UCLa and LCLa closed, the following circuit is established (Fig. 1a):

*Circuit c'—Automatic tabulating initiation*

From the right side of the line, through cam contacts P3', stop key contacts SP, contacts 19a (now closed), line 34, contacts UCLa, contacts LCLa, cam contacts P4, auto start switch 35 (closed), and further on as in circuit c.

Similarly, a circuit through the shunt field 27 of motor TM is established.

The machine now continues to go through successive tabulating cycles in which cards are fed in succession past the upper and lower brushes UB and LB, as long as the group classification of the cards does not change. As previously explained, the shunt paths for maintaining magnet 22 and tabulating clutch magnet 23 energized, comprise shunt paths through T—1 and L—6 plus Y—2, the latter being closed only if the machine is set for listing each tabulating cycle. A third shunt path, between contacts 22a and contacts 19a is through cam contacts C—3. These three shunt paths open each tabulating cycle due to opening of their cam contacts. A fourth shunt path, from contacts 22a to contacts SP is through upper card lever relay contacts UCLa and 19a. This fourth shunt path remains constantly effective until contacts UCLa open due to depletion of cards or until contacts 19a open due to failure of cards at the upper and lower brushes to agree in group classification. During a tabulating cycle, if the card passing through the upper brushes has the same classification item as the card passing the lower brushes, the group control mechanism marked GC in Fig. 1b will have closed a shunt path 36 before cam contacts C—1 of circuit path b—1 open, as fully explained in Patent 1,762,145. The shunt path 36 will maintain magnets 17, 18, and 19 energized until contacts C—1 close again during the same cycle. When the cards at the upper and lower brushes do not have agreeing group control perforations, then circuit 36 does not form and when cam contacts C—1 open, magnets 17, 18, and 19 are deenergized. With magnet 19 deenergized, contacts 19a open and when cam contacts T—1 (or L6) open, all the circuit paths through the tabulating clutch magnet 23 are broken The tabulating cycle means are actuated through the tabulating clutch rendered effective by energization of magnet 23. When magnet 23 is deenergized, due to opening of the four shunt paths therefor, the tabulating cycle means stops operating and the tabulating cycles are interrupted. Ordinarily, as in former practice, the circuit of motor TM is also broken, and a total print and reset cycle is initiated by circuit a—1. Provision is made in the present case, in a manner which will be explained later, for in some circumstances and for certain problems, continuing operation of motor TM after tabulating clutch magnet 23 is deenergized and for also delaying the initiation of a total print and reset cycle.

The cams for operating the cam contacts with the general reference character C, as well as for operating the contacts with the general characters T and L are driven by tabulating motor TM through a clutch connection 38 (diagrammatically shown in Fig. 1a) operative when tabulating clutch magnet 23 is energized.

The cams for operating the contacts given the general reference character P are driven by reset motor RM through the reset clutch (not shown) effective when reset clutch magnet 15 is energized, as disclosed in Patent 1,762,145.

In addition, a special series of cams are provided here, denominated generally as CM (see Fig. 1a) for operating cam contacts with the general designation CM. Cams CM are on a shaft 39 driven continuously and directly from motor TM, without an intervening clutch, as diagrammatically indicated in Fig. 1a. Cams CM may be referred to as the comparison cams and contacts CM—1 to 6 may be referred to as the comparison cam contacts.

The drive ratio between motor TM and shaft 39 is the same as between the motor and the clutch driven shaft 38' (Fig. 1a) so that the two shafts have cycles of equal length. Tabulating clutch 38 can couple the tabulating shaft 38' to the motor driven shaft 39' at only one definite point of the revolution of the latter shaft. The comparison shaft 39 is directly geared to shaft 39'. Hence, tabulating clutch shaft 38' and comparison shaft 39 not only have equal length cycles but when both are in rotation, their cycles are coincident, as indicated in the time chart, Fig. 4.

Two illustrative cases exemplary of applications of the invention to a tabulating machine will be explained. The first case deals with comparing readings of different entry-receiving devices to determine from which one a value is to be read out into another accounting device. More specifically, in the first case a comparison of the totals standing on a pair of accumulator banks is made in order to determine from which one or more of the several banks of the machine the totals are to be read out into the total printing means. The second case concerns the comparison of two values, both of which may be derived from the same record card, or one derived from the record card and the other from a settable value device, in order to select one of several accumulator banks to receive entries from a record card.

The first case will now be explained.

*Case 1—Comparing total readings*

When card lever contacts LCL' were closed, circuit e was established to energize lower card lever relay coil LCL. Relay LCL closed relay contacts LCLa and LCLb. Contacts LCLa are in auto start circuit c', previously traced. Contacts LCLb are in the following special circuit (see middle of Fig. 1a) completed when special cam contacts C—5 close at the "3" point of the tabulating cycle (see Fig. 4):

*Circuit f*

From the right side of the line, through contacts LCLb, contacts C—5, special relay coil 12, special plug connection 37, and to the left side of the line.

Circuit f energizes magnet 12 to close contacts 12b, forming a stick circuit f—1 through normally closed special relay contacts 40a. These latter contacts do not open until near the end of a comparison cycle, as will be later brought out. In the case now being considered; namely, selective total read out or printing under comparison control, the comparison cycle follows the sensing or detecting of a change in the card group. Thus, during the successive tabulating cycles upon cards of the same group, contacts 40 are closed and magnet 12 is continuously energized by the stick circuit through contacts 12b and 40a.

During passage of a lower card through the lower analyzer, when the latter senses a perforation in a selected column, an accumulator entry control circuit is formed as follows:

*Circuit g—Accumulator entry control*

From the right side of the line (Fig. 1a), through contacts P3', contacts T—1, contacts LCLa, binder post 41, line 42, brush 43, contact roll 44, brush 45, line 46, cam contacts T—2 and T—3, wire 47, common contact bar 48 of the lower analyzer, and brush LB sensing a perforation, the contact plate 49 engaged with this brush through the perforation, a connected cable wire 50 (continue with Fig. 1b), the lower brush plugboard socket 51, a plug connection (not shown) to a selected plug socket 52 of one of the accumulator banks Acc. 3, 4, or 5, add magnet 53, contacts 54, a special plug connection 55, and to the left side of the line.

Figure 2:
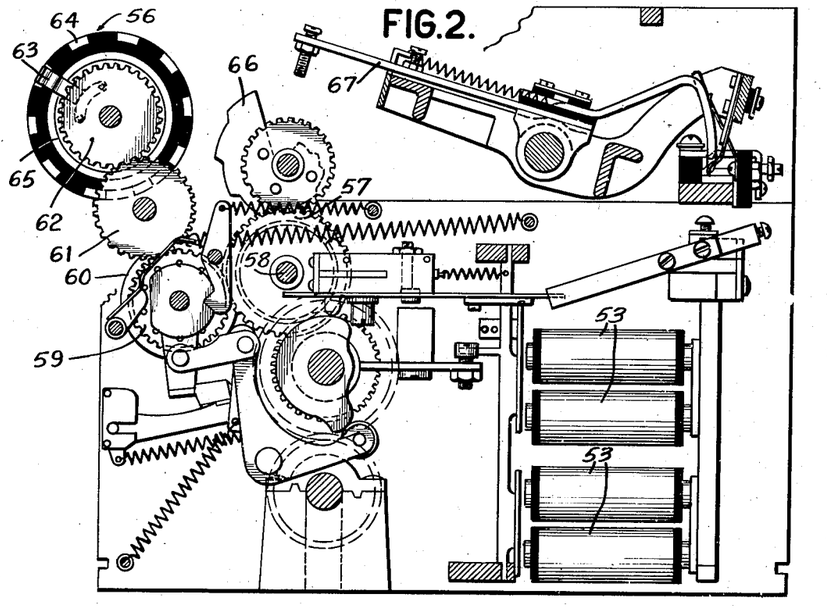
Fig. 2 illustrates an accumulator unit combined with a value read-out commutator.

Fig. 2 shows a single accumulator order including a read-out commutator 56 of the type disclosed in Patent 1,896,551. Energization of magnet 53 by circuit g clutches a gear 57 to a shaft 58 driven by the tabulating motor. The gear 57 thus starts rotating at a differential time in the cycle; it is declutched at a fixed time in the cycle so that rotation of gear 57 is proportional to the value sensed by the lower card analyzer. Gear 57 drives a gear 59 rigid with the indicating wheel 60.

Gear 59, through an intermediate gear 61 rotates a gear 62 which, through insulation, carries the feeler 63. Feeler 63 will thus take a position corresponding to that of the accumulator. Feeler 63 wipes across contact segments 64 insulated from each other and each corresponding to a different value position of the accumulator. Thus, if the accumulator wheel 60 reads "4", then feeler 63 is in engagement with a corresponding "4" value segment 64. Feeler 64 also engages with a common contact ring 65.

There is a similar read-out commutator 56 for each order of the accumulators. At the end of a series of entries in the accumulator, the feelers 63 of a commutator bank engage the segments 64 corresponding to the total standing on the associated accumulator bank. If, for example, the values designated in columns 4 to 8 of the record cards are entered in accumulator bank 3, the latter totals these values and the associated read-out commutators represent this total. Similarly, if the values of columns 18 to 22 of the cards are entered in accumulator bank 4, the read-out commutators associated therewith represent the total of such values.

Figure 3:
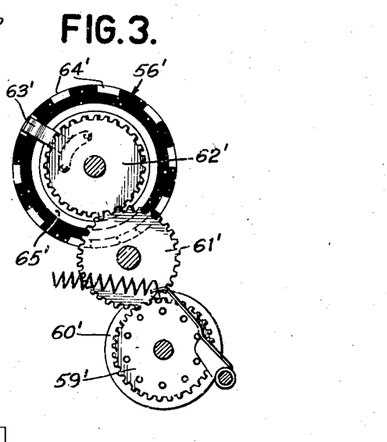
Fig. 3 shows a manually settable read-out commutator.

In addition to the read-out commutators 56 which are set by the accumulator banks, there is also a bank of manually settable read-out commutators 56', similar to a bank of commutators 56. One order of the manually settable read-out commutators is shown in Fig. 3. It includes a hand settable number wheel 60', a gear 59' rigid therewith, a gear 61' meshed with gear 59', a gear 62' meshed with gear 61', a feeler 63' carried by gear 62', a stationary commutator ring with segments 64' and a contact ring 65'. By setting wheel 60' to any desired number, feeler 63' is set in contact with a segment 64' corresponding to such number. Each order of the commutators 56' may be similarly individually set.

Besides the commutators 56 associated with the accumulator banks, there is the usual total read out mechanism comprising the stepped cam 66 geared to the accumulator wheel 57, and the device 67 for sensing the cam 66 during a reset cycle to govern operation of the recording mechanism for printing the total standing on the accumulator. The above elements of the total recording read-out mechanism are shown in Fig. 2. The specific manner in which the total record is made under control of cam 66 and device 67 and further details of the construction may be understood from Patent 1,822,594.

The read-out commutators 56 and 56' form sources of values to be compared by the comparing mechanism. Referring to Fig. 1c, the corresponding value segments 64 and 64' of all the read-out commutators are serially connected. Each serially connected group of commutator segments is wired to a different one of the contact spots 70 of an emitter E. There is one such contact spot 70 for each ordinal value. Emitter E includes feelers 71 carried by arm 72 fast to a shaft 73 geared 1:2 to shaft 39 (see Fig. 1a). Shaft 39 is continuously rotated during operation of the tabulating motor TM and makes one revolution during a comparing cycle. Thus, shaft 73 makes half a revolution each comparing cycle, and during the latter cycle, one brush 71 will successively engage the contact spot 70, beginning with the "9" contact spot while the opposite brush will be wiping the common contact segment 90 of the emitter.

The common contact rings 65 and 65' of the read-out commutators 56 and 56' are individually wired to plug sockets 75 and 75'. Associated with these plug sockets are two sets of plug sockets 76 and 77. If it is desired to compare the total reading of an automatically set read-out commutator 56 with the reading of the manually settable commutator 56', then plug sockets 75' of the latter are connected by plug wires (not shown) to one set of sockets 76 or 77 while plug sockets 75 of the commutator 56 are connected to the other set of sockets 76 or 77. If it is desired to compare the readings of two automatically set commutators 56, then the plug sockets 75 of one are connected, say to plug sockets 76, and the plug sockets 75 of the other commutator 56 are connected to plug sockets 77.

Fig. 1c illustrates four orders in each read-out commutator and four corresponding orders in each bank or set of sockets 76 and 77. Corresponding order sockets 76 and 77 are wired to opposite sides of Wheatstone bridge devices which may be referred to by their common reference character W. These and other denominational order devices may be distinguished hereafter by appending to the common reference character the suffixes th, h, t, or u to represent, respectively, the thousands, hundreds, tens, and units orders.

Each device W includes a pair of parallelly arranged magnets 80 and 81. Uni-directional current valves or rectifiers 82 and 83 are respectively in series with magnets 80 and 81. By means of these rectifiers, current can pass only in one direction through a magnet 80 and only in the opposite direction through magnet 81.

Resistances r and r' of each device W are equal in value. Hence, when the circuit paths through magnets 80 and 81 are simultaneously closed there will be no potential difference between the opposite sides of the Wheatstone bridge device and consequently neither magnet will be energized. When the line circuit is closed only through one magnet 80 or 81, then there will be a potential drop across the sides of the Wheatstone bridge, and the magnet through which the line circuit is completed will be energized.

In case 1, now under discussion, the line circuits through magnets 80 and 81 are selectively completed during the comparison cycle following a change in the group classification of the cards under the upper and lower brushes. This comparison cycle also precedes the total print and reset cycle.

It will be recalled that circuit b, was formed during the third reset cycle to energize magnets 17, 18 and 19, and that an automatic tabulating initiation circuit c' was formed near the close of the third reset cycle to cause tabulating cycles to continue until cam contacts C—1 opened to detect a break in group control shunt path 36. During each tabulating cycle, when cam contacts C—1 open, then the circuit through magnets 17, 18, and 19 is maintained through the group control shunt path 36 so long as the cards at the upper and lower brushes are of the same group.

Thus, during tabulating cycles with the machine acting on cards of the same group, magnet 18 is energized and thereby holds its normally closed armature contacts 18a open. It will be recalled also that stick circuit f—1 was established through magnet 12 to maintain the latter energized through contacts 40a which remain closed until the end of a comparison operation. Hence, during tabulating cycles, with cards of the same group passing the upper and lower analyzers, contacts 18a are open while contacts 12c in series with contacts 18a (see the middle of Fig. 1a) are closed.

When a group change is sensed during a tabulating cycle, group control shunt path 36 remains open, and after the item reading period, when contacts C—1 open, the circuit through magnets 17, 18, and 19 is broken and these magnets are deenergized.

Upon deenergization of magnet 19, contacts 19a in the fourth shunt path for magnets 22 and 23, extending through UCLa, is rendered ineffective. The third shunt path, through cam contacts C—3, opened previously during the tabulating cycle and when contacts T—1 (or L6) open, then tabulating clutch magnet 23 is deenergized and the mechanism driven by the tabulating motor through the tabulating clutch stops at the end of the tabulating cycle during which the group change was sensed. Ordinarily, the circuit through motor TM would also be broken and motor TM would stop, but this is not the case here. It is desired to keep motor TM and comparison cam shaft 39 and emitter shaft 73, directly geared to the motor, running for another cycle during which the comparison operation is performed. The additional cycle which intervenes between the tabulating cycle in which the group change occurred and the total print and reset cycle may be referred to as the comparison cycle.

When the circuit through magnets 17, 18, and 19 is broken due to a group change, magnet 18 is deenergized and contacts 18a close. Stick circuit f—1 through relay 12 is still closed so that relay contacts 12c are now closed. Contacts 18a close due to a group change when cam contacts C—1 open after the item analyzing period 9 through 0 (see Fig. 4). After this happens, special cam contacts C—6 close and remain closed till the end of the instant tabulating cycle and through the first part of the next tabulating cycle. With contacts 18a, 12c, and C—6 closed, the following circuit forms (Fig. 1a):

Circuit h

From the left side of the line, through contacts 12c, contacts 18a, pick-up coil 84 of a duo wound relay M, cam contacts C—6, and to the right side of the line.

Energization of coil 84 by circuit h opens relay contacts Ma and Mb, respectively in the armature and shunt field circuits of tabulating motor TM and closes relay contacts Md and Me. Closing of contacts Md forms the following circuit (Fig. 1a):

Circuit i

From the left side of the line, through series field 26, the armature of motor TM, contacts Md, lead 30, and the right side of the line.

Closing of contacts Me and Md forms the following circuit (Fig. 1a):

Circuit j

From the left side of the line, through shunt field 27, contacts Me, contacts Md, line 30, and the right side of the line.

As a result of formation of circuits i and j, motor TM continues in operation until contacts Md and Me open. Contacts C—6 are still closed at the end of the tabulating cycle (see Fig. 4). Consequently circuit h is still closed and pick-up coil 84 of magnet M still energized to maintain contacts Md and Me closed when the tabulating cycle, during which the group change occurred, ends. The tabulating clutch magnet 23, however, is deenergized when contacts Ma are opened by circuit h and the tabulating mechanism driven through the tabulating clutch 38 consequently stops at the end of the tabulating cycle, as in former practice.

Normally, also, closing of contacts 13 due to release of the tabulating clutch would initiate a reset cycle. However, contacts 12a of auto reset circuit a—1 are being held open by magnet 12 and thereby prevent the normal automatic initiation of a reset cycle at this time. Manual initiation of reset cycle a is also prevented by opening of contacts 12a. Also, while contacts 12a are open, a reset circuit a—2 through contacts Mh and CM—5, to be traced later, cannot be made.

The clutch driven tabulating mechanism has now stopped, the reset cycle is held in abeyance, coil 84 of magnet M is energized, and motor TM is continuing to run. The machine now goes through a comparing cycle during which comparing shafts 39 and 73 are rotated by motor TM. At the beginning of this cycle, contacts CM—1 close. Coil 84 of magnet M has already closed contacts Mc. With contacts CM—1 and Mc closed, the following circuit is formed (Fig. 1a):

Circuit h—1

From the left side, through contacts Mc, holding coil 85 of magnet M, contacts CM—1, and to the right side.

Energization of coil 85 holds all the normally open contacts M closed and the several normally closed contacts M open until contacts CM—1 open near the end of the comparing cycle. During the comparison cycle, relay 12 is deenergized, as will be later explained, to open contacts 12c of circuit h, and when contacts CM—1 also open, circuit h—1 is broken and motor TM stops.

To briefly recapitulate, a group change has been sensed, the automatic group sensing control has caused tabulating cycles to stop after the lower card has passed the lower brushes, magnet 18 was deenergized due to the group change and its contacts 18a are now closed, duo wound relay M has been energized, contacts Ma and Mb have been opened and contacts Md and Me closed by magnet M to cause motor TM to continue in operation to drive the comparing shaft 39 and 73 for a comparing cycle during which the comparison operation is to be performed.

The reset cycle has been postponed by opening of contacts 12a.

Assume that the items from one of the card fields has been entered in Acc. 3 and the items from another of the card fields has been entered in Acc. 4. Accordingly, the read-out commutators 56 of Acc. 3 will now have their feelers 63 engaged with the segments 64 representing the total of items taken from one of the card fields while the commutators 56 of Acc. 4 will have their feelers engaged with segments 64 corresponding to the total of items taken from the other card field. Plug connections (not shown) have been preliminarily made between plug sockets 75 (see Fig. 1c) of Acc. 3 commutator 56 and, say, plug sockets 76 while plug connections have been made between plug sockets 75 of the Acc. 4 commutator to plug sockets 77. In addition, a plug connection (not shown) has been made between a plug socket 88 connected to the common segment 90 of emitter E and a plug socket 89.

Energization of magnet M conditioned motor TM for continued operation after the group change was sensed. The energization of magnet M also conditions the comparison means for making a comparison of the totals standing on the accumulators to be compared. This comparison takes place during the comparison cycle which follows the tabulating cycle during which the pick-up coil 84 of magnet M was energized as a result of a group change.

Magnet M, upon energization, closes contacts Mf (top of Fig. 1c). Contacts CM—2 close at the beginning of the comparison cycle. Emitter E is rotating counterclockwise to engage a feeler 71 successively with contact spots 70 connected to segments 64 of Acc. 3 and Acc. 4 commutators 56.

Assume that Acc. 3 commutator stands at 7358 and Acc. 4 commutator at 6459. During rotation of feeler 71 of emitter E, it will engage the "9" contact spot 70 first, and as it does so, the following circuit is formed (Fig. 1c):

*Circuit k—Commutator read-out pick-up*

From the left side of the line, through closed relay contacts Mf, cam contacts CM—2, the plug connection (not shown) between sockets 89 and 88, contact segment 90 of emitter E, a brush 71, the opposite brush 71, the "9" contact spot 70, the "9" segment 64 in the units order of Acc. 4 commutator, the feeler 63 engaged therewith, units order contact ring 65 of Acc. 4 commutator, plug socket 75 connected therewith, the plug connection (not shown) to the units order (right hand one) socket 77, the right side of Wheatstone bridge W—u, rectifier 83 thereof, magnet 81u, resistance r, and to the right side of the line.

Circuit k energizes magnet 81u and the latter closes contacts 81—91a—u. Closing of these contacts forms the following circuit (Fig. 1c):

*Circuit k-1—Commutator read-out holding*

From the left side of the line, through cam contacts CM6, contacts 81—91a—u, coil 91u, and to the right side of the line.

Coils 81u and 91u are wound on the same core to constitute a duo wound relay. Energization of coil 81u is momentary but energization of coil 91u maintains contacts 81—91a—u closed and circuit k—1 is maintained until cam contacts CM6 open near the end of the comparison cycle.

Energization of coil 91u also closes contacts 91b—u and opens contacts 91c—u.

Upon closing of contacts 91b—u, the following circuit is established:

*Circuit L*

From the left side of the line, through common lead 92, contacts 91b—u, line 93, normally closed contacts 94c—u, line 95, magnet 96u, and to the right side of the line.

Energization of magnet 96u is effected by circuit L and the magnet closes contacts 96a—u and b—u and opens contacts 96c—u.

Closing of contacts 96a—u forms a stick circuit through magnet 96—u as follows:

*Circuit L—1*

From the left side of the line, through cam contacts CM6, lead 97, common wire 98, contacts 96a—u, magnet 96u and to the right side of line.

To recapitulate, as a result of sensing of a "9" value in the units order of the Acc. 4 read-out commutator 56, coil 81u of Wheatstone bridge device W—u was momentarily energized by circuit k to close contacts 81—91a—u. This established circuit k—1 to energize coil 91—u with resultant maintained closure of contacts 81—91a—u, closure of contacts 91b—u, and opening of contacts 91c—u. Closing of contacts 91b—u formed a circuit L through magnet 96u, energization of which closed contacts 96a—u and b—u and opened contacts 96c—u. Closing of contacts 96a—u formed stick circuit L—1 through magnet 96u.

In the assumed example, Acc. 3 commutator 56 stands at 7358 and Acc. 4 commutator at 6459. The first value sensed was the "9" which is in the units order of the Acc. 4 commutator 56. The second value sensed is the "8" which is in the units order of Acc. 3 commutator 56. When this occurs, a circuit similar to circuit k is formed which goes through the emitter E, the contact segment "8" of the units order of Acc. 3 commutator, the plug connection to units order plug socket 76, through rectifier 82, coil 80u, resistance r', and to the right side of the line.

Energization of magnet 80u closes contacts 80—94a—u. A holding circuit similar to circuit k—1, described above, is formed through coil 94u, causing 94b—u to close and contacts 94c—u to open.

Contacts 94c—u are in circuit L, previously traced and opening of these contacts breaks this circuit but magnet 96u remains energized by stick circuit L—1.

Contacts 94b—u are in series with contacts 91c—u. The latter were opened by previous energization of magnet 91u. Consequently, the subsequent closure of contacts 94b—u is unavailing to complete a circuit through magnet 99u.

Thus, when units order magnet 96u is energized first, then units order magnet 99u cannot be energized during the same comparison cycle. Likewise, if magnet 99u had been energized first, then magnet 96u could not have been energized. Similarly, with respect to the other orders of magnets 96 and 99, when one is energized, the other in the same order remains unenergized. The higher value in the corresponding orders of Acc. 3 or Acc. 4 determines whether magnet 96 or 99 of that order is to be energized. When the values in corresponding orders are equal, then neither of magnets 80 and 81 of that order is energized and consequently neither magnet 96 nor 99 of the order is energized.

Thus, the tens order values of the two commutators being compared are both "5" in the assumed example. Emitter E will sense the "5" segments 64 of the compared commutators simultaneously. As a result of the sensing of the "5" segment of Acc. 3 commutator 56, a circuit path will be closed through rectifier 82 and magnet 80 of the tens order Wheatstone bridge W—t. Simultaneously, sensing of the "5" segment of Acc. 4 commutator 56 will close a circuit path through rectifier 83 and magnet 81 of bridge W—t. As a result, the potential at opposite sides of the bridge W—t will be equal, so that no current can flow through either magnet 80 or 81 of bridge W—t. Consequently neither magnet 91t nor 94t is energized, neither of the pair of contacts 91b—t nor 94b—t is closed, and a circuit L is not established through either magnet 96t or 99t.

The assumed example involved a comparison of Acc. 3 with Acc. 4. If it were desired to compare Acc. 3 or Acc. 4 with the value manually set up on the commutator 56', then plug sockets 75' of the latter would be plugged, say, to sockets 77, and the plug sockets 75 of the accumulator readout commutator 56 to be compared would be plugged to the other set of sockets 76. The comparison of the values on commutator 56' and one of commutators 56 would effect selective energization of magnets 96 and 99 in the manner described above.

If all the higher order values are respectively equal, then the comparison of the lowest order values will determine the control to be effected by the comparison operation. Thus, if values 1246 and 1247 were compared, only magnet 99u or 96u would be energized, depending on whether the commutator having "7" in its unit order were plugged to socket 76 or 77.

Assume that magnet 96u alone is energized, then contacts 96b—u are closed and contacts 96c—u are open. The following circuit would then be completed through contacts 96b—u when cam contacts CM—3 closed:

*Circuit m*

From the left side of the line, through cam contacts CM—3, magnet 100, contacts 96b—u, line 101, normally closed contacts 99c—u, l'ne 102, contacts 96c—t, line 103, contacts 99c—t, line 104, contacts 96c—h, line 105, contacts 99c—h, line 106, contacts 96c—th, line 107, contacts 99c—th, and through line 108 to the right side of the supply line.

It is clear from the above that if any of the contacts 96c or 99c above the units order had been opened, that circuit m could not have been completed through contacts 96b—u. In other words, energization of the units order magnet 96 is effective to close circuit m when no higher order magnets of either series 96 or 99 have been energized which is the case only when all the higher order values in one compared number are equal to the corresponding higher order values in the other compared number. If either a tens, hundreds, or thousands order value of one number is greater than the corresponding order values of the other number, then a magnet 99 or 96 above the units order will be energized, and consequently one of such higher order contacts 96c or 99c will be open to prevent making of circuit m of magnet 100 through units order contacts 96b—u.

If only magnet 99u has been energized by the comparison, then the following circuit will form when cam contacts CM—3 close:

*Circuit n*

From the left side of the line, through contacts CM—3, magnet 110, contacts 99b—u, line 102, contacts 96c—t, line 103, contacts 99c—t, and so on serially through contacts 96c—h, 99c—h, 96c—th, and 99c—th, then through line 108 to the right side of the supply line.

Contacts 96c and 99c thus form a guard to prevent a lower order set up of the magnets 96 and 99 from controlling energization of either magnet 100 or 110 when a higher order set up is in effect. Thus, in the first assumed example, where Acc. 3 reads 7358 and Acc. 4 reads 6459, the "7" in the thousands order of Acc. 3 will be the controlling value, and magnet 110 will have been energized at the end of the comparison read out period.

Magnet 100 is the pick-up coil of a duo wound relay of which magnet 100' is the holding coil. Likewise magnet 110 is the pick-up coil and magnet 110' the holding coil of a duo wound relay. Energization of magnet 100 closes contacts 100a to form a holding circuit as follows:

*Circuit m—1*

From the left side of the line, through initially closed reset cycle cam contacts CP1, plug socket 112, plug wire 113, plug socket 114, coil 100', contacts 100a, and to the right side.

Similarly, a holding circuit n—1 is formed through coil 110' and contacts 110a.

Figure 4:
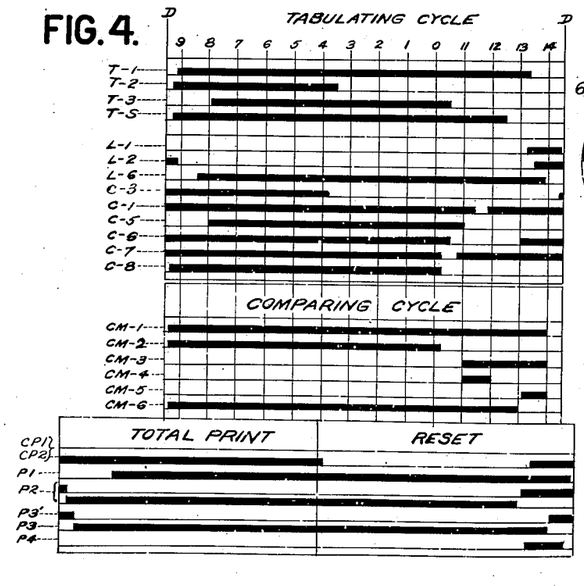
Fig. 4 is a timing chart.

Due to these holding circuits, magnets 100' and 110' remain energized after cam contacts CM—3 open near the end of the comparison cycle and remain energized until cam contacts CP1 open after the printing part of the following total print and reset cycle (see Fig. 4).

Figure 1B:
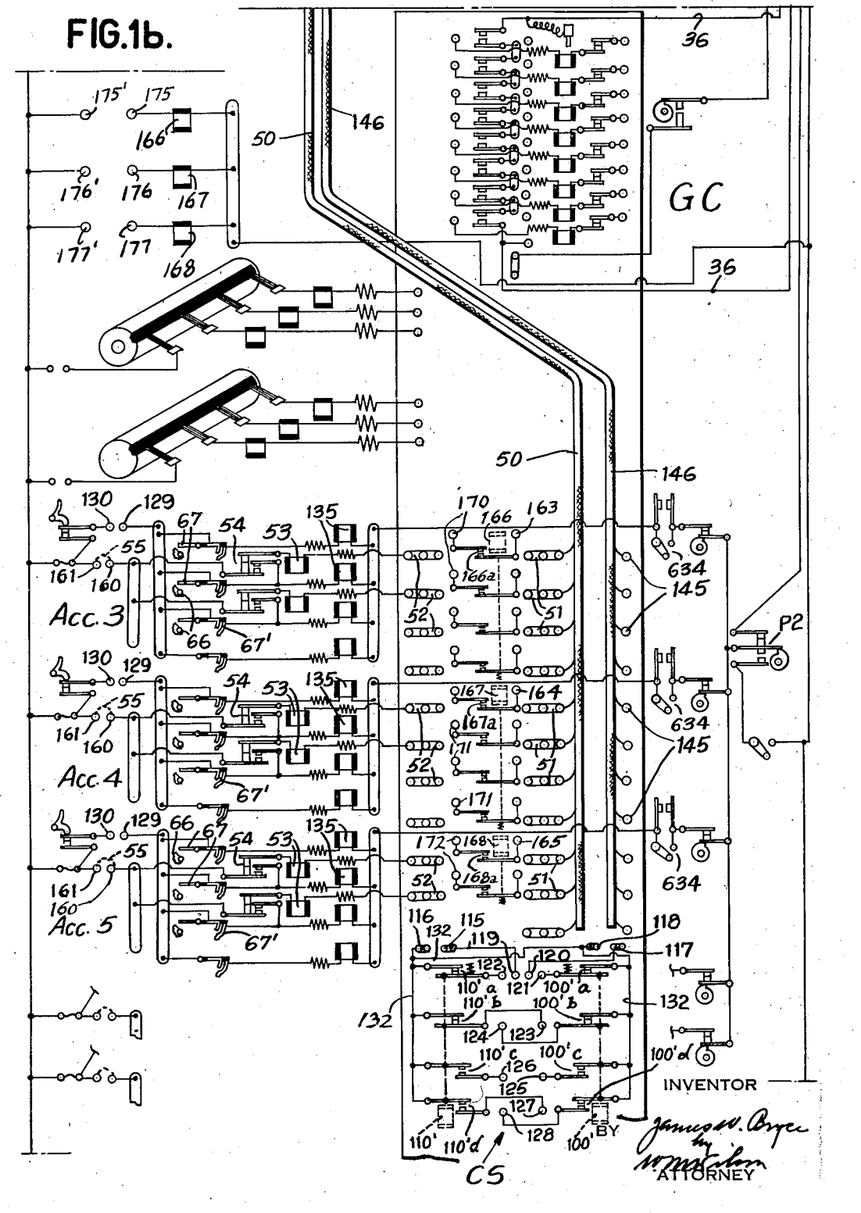
Figure 1C:
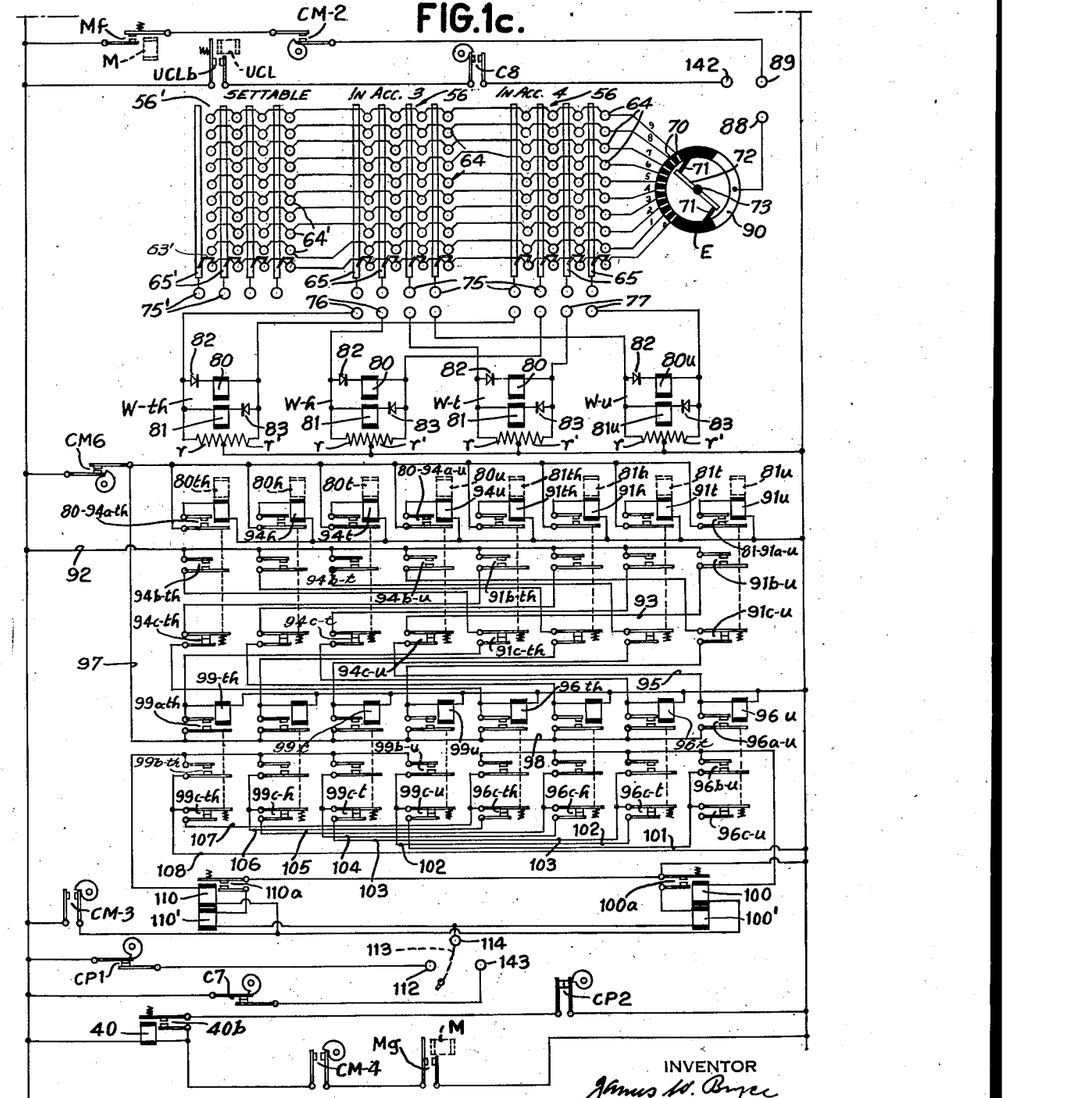
Fig. 1c is a circuit diagram of the value comparing means.

Magnet 100', when energized, opens relay contacts 100'a and b and closes relay contacts 100'c and d of a comparison selection device CS (see the bottom of Fig. 1b). Magnet 110', when energized, opens contacts 110'a and b and closes contacts 110'c and d.

As explained above, only one of these two magnets 100' or 110' is energized in accordance with the comparison of the total standing on a pair of accumulator banks or on one accumulator bank and a manually set up counter bank.

Figure 5:
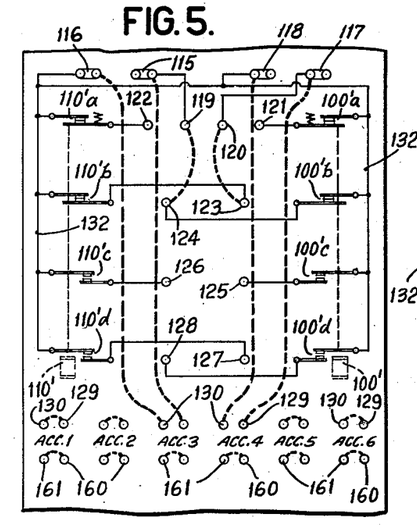
Fig. 5 shows the plugging arrangement and elements whereby the comparing means is enabled to cause one selective read out of totalizers.

A special bank of plug sockets 115, 116, 117, 118, 119, 120, 121, 122, 123, 124, 125, 126, 127 and 128 is provided (see the bottom of Fig. 1b). By different combinations of plug connections to these plug sockets, a variety of operations may be obtained. For example, if it is desired to print the total on Acc. 3 if it is greater than the total on Acc. 4, to print the total on Acc. 4 if it is greater than the total on Acc. 3, and to print the totals of both accumulator banks when these totals are equal, the following plug connections are made as indicated in Fig. 5:

From special plug socket 129 of Acc. 3 (Fig. 1b) to plug socket 115, from plug socket 130 to socket 116, from plug sockets 129 and 130 of Acc. 4 to plug sockets 117 and 118 respectively; from plug socket 119 to plug socket 124, and from plug socket 120 to plug socket 123. Now, with the previously described connections between Acc. 3 read-out commutator 56 and plug sockets 76 of the comparison sensing circuits and between Acc. 4 commutator 56 and plug sockets 77, if the total on Acc. 3 is greater than that of Acc. 4, then magnet 110' will be energized and contacts 110'a and b will open, while contacts 100'a and b will remain closed.

Plug sockets 129 and 130 of Acc. 3 will then be bridged as follows: By the plug connections between sockets 129 and 115, sockets 119 and 124, through contacts 100'b, line 132, and the plug connection between sockets 116 and 130.

The bridge between sockets 129 and 130 of Acc. 4 will be open since this bridge must include contacts 110'b which have been opened by the comparison.

If the comparison senses equal totals, then neither magnet 110' nor 100' will be energized, both contacts 110'b and 100'b will remain closed, and the bridges between the sockets 129 and 130 of both Acc. 3 and Acc. 4 will be closed.

If it is desired to omit total printing from either Acc. 3 or Acc. 4 when the totals are equal and to print only the higher total when the totals are unequal, then the plug connections instead of being made between 119 and 124 and between 120 and 123 are made between 119 and 126 and between 120 and 125. Now, if the comparison indicated equal totals, then neither contacts 100'c nor 110'c will be closed and the bridges between sockets 129 and 130 of Acc. 3 and Acc. 4 will both be open at 110'c and 100'c. If Acc. 4 has a greater total, then contacts 100'c will be closed and 110'c open. The bridge between sockets 129 and 130 of Acc. 4 will then be completed from socket 129 to sockets 117, 120, 125, contacts 100'c, line 132, socket 118 and to socket 130. Similarly, a bridge across sockets 129 and 130 of Acc. 3 will be completed through contacts 110'c when the total on Acc. 3 is higher.

If it is desired to print the lesser instead of the greater total, a plug connection will be made between sockets 119 and 122 and between sockets 120 and 121. Then, if Acc. 3 has a greater total, the bridge between sockets 129 and 130 will be broken by opening of contacts 110'a, while if Acc. 4 has a greater total, contacts 100'a will be open to break the bridge between sockets 129 and 130 of Acc. 4. In the latter case, both totals will be printed if they are equal. If it is desired to print the lesser total and omit printing of equal totals, the connections are made between sockets 119 and 128 and between 120 and 127. Then, if the Acc. 3 total is less, contacts 100'd will be closed to complete a bridge across sockets 129 and 130 of Acc. 3 while if the Acc. 4 total is less, a bridge will be completed across sockets 129 and 130 of Acc. 4 by closing of contacts 110'd. If the totals are equal, contacts 100'd and 110'd remain open to prevent making of either bridge.

Figure 6:
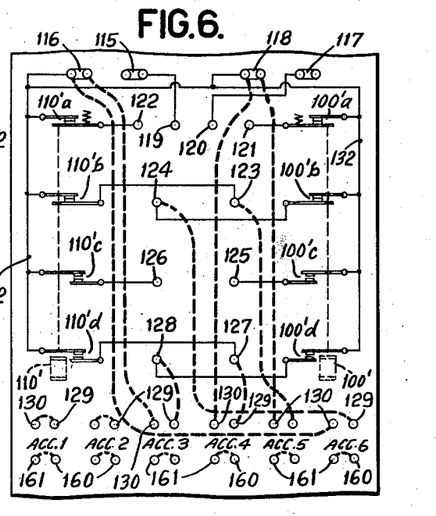
Fig. 6 shows the plugging arrangement for causing a different selective readout.

The several cases mentioned above are illustrative and still other arrangement of the plug connections may be made for different results. Thus, if desired, neither the Acc. 3 or Acc. 4 total will be printed but another printing bank related to another accumulator bank, as to Acc. 5 may print or not print the total from said accumulator depending on whether the Acc. 3 total is greater than, less than, or equal to the Acc. 4 total. To effect the above results, the plug sockets 129 and 130 of Acc. 5 may be plugged to either sockets 115 and 116 or to 117 and 118 and the remaining plug connections made as indicated before. It is also possible to connect the total print lines of two banks other than Acc. 3 and Acc. 4 to the print selecting device set up by the comparison read out. This may be done in the same manner as described with respect to the print selection of Acc. 3 and Acc. 4. For example, assume it is desired to read out Acc. 3 and Acc. 5 if Acc. 3 is less than Acc. 4; to read out Acc. 4 and Acc. 6 if Acc 4 is less than Acc. 3; and to read out only Acc. 5 and Acc. 6 if Acc. 3 equals Acc. 4. The plug connections shown in Fig. 6 will effect the above results. These plug connections are from sockets 129 and 130 of Acc. 3 to sockets 128 and 116, from sockets 129 and 130 of Acc. 5 to sockets 123 and 118, from sockets 129 and 130 of Acc. 4 to sockets 127 and 118; and from sockets 129 and 130 of Acc. 6 to sockets 124 and 116. Then if Acc. 3 is less than Acc. 4, contacts 100'd will be closed and the bridge between sockets 129 and 130 of Acc. 3 completed, but this bridge will remain open if Acc. 3 is equal to or greater than Acc. 4. Likewise, with Acc. 3 less than or equal to Acc. 4, contacts 110'b will remain closed and the bridge between sockets 129 and 130 of Acc. 5 will be closed. Similarly, the bridges between sockets 129 and 130 of Acc. 4 and Acc. 6 will be selectively closed or open under the conditions stated and with the plugging shown in Fig. 6.

It is further possible to print from, say, Acc. 3 and Acc. 5 when the total on Acc. 3 is greater, lesser, or equal to the total of Acc. 4, as may be desired. To do this, a plug connection may be made from both the sockets 129 of Acc. 3 and Acc. 5 to sockets 115 and from both sockets 130 of Acc. 3 and Acc. 5 to sockets 116. It is also possible to do this by connecting sockets 129 and 130 of Acc. 3 to sockets 115 and 116 and sockets 129 and 130 of Acc. 5 to sockets 117 and 118. Then if, for instance, the readings of Acc. 3 and Acc. 5 are to be printed when the total on Acc. 3 is greater than the total on Acc. 4, a further connection will be made from socket 119 to socket 124 and a connection made from socket 120 to socket 121. When the Acc. 4 total is less, both contacts 100'a and 100'b will remain closed to complete the bridges of Acc. 3 and Acc. 5. A still further possibility is to print from one bank if the Acc. 3 total is greater, to print from another bank if the Acc. 4 total is greater, and to print from still another bank if the totals are equal. To do this, plug socket 129 of say bank #3 to socket 126 and socket 130 to socket 116. Then the Acc. 3 total will be printed if the Acc. 3 total is greater. Also plug sockets 129 and 130 of bank #4, for instance, to sockets 125 and 118, respectively of device CS. Then when #4 total is greater, the #4 total will be printed. Also plug sockets 129 and 130 of say Acc. 5 to sockets 123 and 124 respectively of device CS. Then when the totals of Accs. 3 and 4 are equal, contacts 100'b and 110'b will remain closed and the bridge across 129 and 130 of Acc. 5 will be closed by the plug connection to socket 123, through contacts 110'b, line 132, contacts 100'b, and the plug connection from socket 124 to socket 130.

The comparison operation has now selectively closed a bridge across sockets 129 and 130 of one or more selected accumulator banks. The machine is now ready for a total print and reset cycle. It will be recalled that after the group change was sensed, the reset cycle was held in abeyance by reason of contacts 12a in the reset circuits a and a—1 being held open by energization of magnet 12. Circuit f—1, which is holding the magnet 12 energized, includes normally closed relay contacts 40a. Contacts 40a are opened after the comparison of two readings has been made and has energized one of the magnets 100' or 110'. To open contacts 40a, magnet 40 (see the bottom of Fig. 1c) is energized as follows when cam contacts CM—4 close.

*Circuit o*

From the left side of the line, through magnet 40, contacts CM—4, relay contacts Mg (closed by relay M), and to the right side of the line.

Energization of magnet 40 results and opens relay contacts 40a in circuit f—1, thereby deenergizing magnet 12. Magnet 40 also closes armature contacts 40b to form a stick circuit for the magnet 40 through printing cycle cam contacts CP2. Deenergization of magnet 12 permits contacts 12c to open and break circuit h of pick-up coil 84 of magnet M. Holding coil 85 of magnet M is still energized by circuit h—1 and is holding relay contacts Mh (Fig. 1a) closed. Circuit f—1 having been broken by opening of contacts 40a, relay 12 was deenergized to permit contacts 12a to close.

With contacts 12a and Mh closed, when contacts CM—5 close later in the comparison cycle, an automatic reset initiation circuit is formed as follows (see the middle of Fig. 1a):

*Circuit a–2—Automatic reset following comparison*

From the right side of the line, through wire 30, contacts CM—5, contacts Mh, contacts 12a, contacts 13, and as before in circuit a.

A total print and reset cycle now takes place. After initiation of the total print and reset cycle, cam contacts CM—1 open to break circuit h—1 and deenergize the holding coil 85 of magnet M, and as a result contacts Md and e reopen and contacts Ma and b reclose. This causes motor TM to stop and reverts the control of the rotor TM and tabulating clutch magnet 23 to circuit c. The comparison cycle is now complete.

During the total print and reset cycle initiated by the comparison cycle means, fingers 67 (Fig. 3) move down to sense cams 66 of the accumulator and print banks and to close contacts 67' (see Fig. 1b) at a differential time, as explained in Patent No. 1,822,594.

In the present case contacts 67', when closed, complete a circuit through print magnets 135 only when the plug sockets 129 and 130 are connected by a closed bridge. With those accumulator and print banks in which total printing is not under control of the comparison read-out, this bridge is formed by direct plug connections between sockets 129 and 130. With those banks from which total printing is controlled by the comparison read-out, plug sockets 129 and 130 are connected through the comparison selection device CS, as previously explained, and hence total printing will or will not occur depending on the set-up of the comparison device CS by the comparison operation and also on the conditions imposed by the plugging connections made within the device CS. After the printing part of the reset cycle, cam contacts CP1 and CP2 open. Opening of contacts CP1 breaks the circuit through magnet 100' or 110', and opening of contacts CP2 breaks the holding circuit through magnet 40. All the parts related to the comparison means are now in their initial condition.

One instance of the utility of case 1 is in preparing an inventory value report. Thus, Acc. 3 may accumulate costs of inventory items, Acc. 4 may accumulate market values of the items, and Acc. 5 may accumulate estimated values of the items. The comparison device CS may be connected to the accumulator banks to cause printing of the total cost of the items from Acc. 3 if this total is less than the total of market values standing on Acc. 4, to print the total of market values from Acc. 4 if less than the cost total, and to print the total of estimated values from Acc. 5 if the values on Acc. 3 and Acc. 4 are equal. The comparison will be made of the Acc. 3 and Acc. 4 total read-out commutators 56 and in accordance with the relative magnitudes of the compared values, the total of the costs, market values, or estimated values will be printed.

The device CS may also be connected to the accumulator banks to furnish different total printing conditions. For instance, the device CS may be adjusted to cause the Acc. 3 total or the Acc. 4 total to be printed depending on which is the greater and to cause printing of the Acc. 5 total when the Acc. 4 and the Acc. 5 totals are equal.

Another instance of the utility of case 1 is in preparing a wage report. In certain factories, a workman is required to turn out a predetermined number of units of manufacture as a standard quantity in a given period. If he just reaches the standard, he is paid an average wage for the given period, if he exceeds the standard, a bonus is added to the average wage. Each group of cards fed through the machine may cover the information regarding the output and related facts of a single workman for a number of given periods.

The settable commutator 56' may be set to read out the total quantity of units supposed to be turned out in the number of periods covered by each group of cards. Acc. 3 may accumulate the total of units actually turned out, Acc. 4 may accumulate the average wages assigned to the different periods covered by a group of cards, and Acc. 5 may accumulate the bonuses assigned for such periods. The Acc 3 total is compared with the total on the settable accumulator and for this purpose, assume the plug sockets 75' of the settable commutator are connected to plug sockets 77 (Fig. 1c) while the plug sockets 75 of the Acc. 3 commutator 56 are connected to plug sockets 76. Then, if the total in Acc. 3 is greater than that in the settable commutator, the comparison cycle will result in energization of magnet 110' of the comparison selection device CS. If the totals in the two commutators 56 and 56' are equal, then neither magnet 110' nor 100' will be energized. The comparison device may be set to cause printing of the total of the average wages from Acc. 4 if the Acc. 3 and the settable accumulator totals are equal, and printing of the total of the bonuses from Acc. 5 along with the total of average wages from Acc. 4 if the Acc. 3 total exceeds the settable total.

To effect the above control by device CS, the plug sockets 129 and 130 of Acc. 4 may be connected by plug wires, respectively, to sockets 121 and 118 or 124, and the plug sockets 129 and 130 of Acc. 5 may be connected, respectively, to sockets 126 and 116 or 127.

*Case 2*

Case 2 deals with control by the comparing means of the entry of items into the accounting apparatus. The comparison may be made between two fields of each record card or between one field of each card and a value set up on the commutator 56'.

Before beginning operations, plug connection 37 in series with magnet 12 is removed. This prevents circuits f or f—1 from being established, and disables magnet 12 from any control function in case 2. Since magnet 12 cannot function, circuit h through pick-up coil 84 of magnet M cannot be made upon a group change as was done in the first case and, hence magnet M remains deenergized, contacts Ma and Mb in the TM motor and field circuits remain closed, and the tabulating motor stops upon a change in card group. Also since contacts 12a in the reset circuit remain closed, the change in card group will initiate a total print and reset cycle by the formation of auto reset circuit a—1.

In addition, for the second case, the operator directly plugs across sockets 129 and 130 of the accumulator and print banks.

Further, in the circuit of emitter E (Fig. 1c), the operator, instead of plugging across sockets 88 and 89, plugs across sockets 88 and 142. This places the emitter circuit under control of the special tabulating cam contacts C8 and of upper card lever relay contacts UCLb. Further still, the operator disconnects plug wire 113 (see bottom of Fig. 1c) from socket 112 and plugs it across sockets 114 and 143, placing the circuit of comparison set up magnets 100' and 110' under control of special tabulating cam contacts C7.

Before describing further connections, the scheme of operation will be outlined. The upper card analyzer during one tabulating cycle will sense the card field or fields to be compared. The comparison will energize one or the other of magnets 100' or 110' to close connections in the entry circuits of the accumulators to be controlled by the device CS, these connections conditioning the accumulators selected by device CS for receiving entries. During the next tabulating cycle, the same card will go through the lower card analyzer, and under control of the latter, entry of the item from a field of the card will be made into the accumulator selected by the comparison means during the preceding tabulating cycle.

If the comparison is to be made between one field of a card and a fixed set up, plug connections are made between upper brush sockets 145 (Fig. 1b) corresponding to the columns in said card field and either set of sockets 76 or 77 (Fig. 1c) while the other set of sockets 76 or 77 is plug-connected to sockets 75' of the settable read-out commutator 56'. If the comparison is to be between two fields of a record card, then upper brush sockets 145 related to one such field are connected to sockets 76, for instance, and the sockets 145 related to the other such field are plugged to the other set of sockets 77.

First: let it be assumed that the item in card columns 19, 20, and 21 is to be compared with a fixed value, say 492, set up on commutator 56'. Upper brush plug sockets 145 are connected through cable wires 146 (Figs. 1a and 1b) with the analyzing plates 147 of the upper analyzer. The plug sockets 145 connected with the plates 147 which sense columns 19, 20, 21 are plugged, respectively, to the hundreds, tens, and units orders of sockets 76 (Fig. 1c) of the comparison means.

The three lower orders of sockets 75' are plugged to the corresponding orders of sockets 77 of the comparison means. The operator sets commutator 56' to the selected value, say 492.

As in case 1, near the end of the first tabulating cycle, the first card of a group causes upper card lever contacts UCL' to make and form circuit d for energizing relay UCL. During the second tabulating cycle, the first card traverses the upper analyzer. It may be noted here that the zero perforations in the card field to be compared may be omitted. As is well known, the zero perforation performs no function in the setting of the type bar which automatically and mechanically moves to zero printing position in the event that analysis of a significant figure perforation in the column has not occurred. The zeros to the right of the first significant figure of a number are printed as a result of this mechanical setting of the type bars, while the zeros to the left of the first significant figure are eliminated, as known in the art. Also, the zero perforation results in no change in the position of an accumulator wheel. With the zero perforations, in the card fields to be compared, omitted, the zero spots of the read-out commutators 56 and 56' need not be wired to the emitter E. However, for the present illustration of the invention, it is assumed that the zero perforations are made in the card fields and, accordingly, the zero spots of the readout commutators are shown wired to the emitter.

During the period in which index point positions 9 through 0 of the card traverse upper brushes UB, tabulating cam contacts C8 (Fig. 1c, at the top) are closed. Contacts UCLb have also been closed by energization of relay UCL. In emitter E, a feeler 71 is traversing contact spots 70 in synchronism with the travel of index points 9 through 0 past the upper brushes UB. If the digit set up in an order of the commutator 56' is different than the digit in the corresponding order column 19, 20 or 21 of the upper card, then the following circuit will be completed when brush 71 reaches the contact spot 70 corresponding to such set up digit (Fig. 1c);

*Circuit L'—Fixed value comparison sensing*

From the left side of the line, through contacts UCLb, cam contacts C8, plug socket 142, the plug connection (not shown) to plug socket 88, common 90 of emitter E, brushes 71, a contact spot 70, contact segment 64', corresponding to the set up digit, feeler 63' engaged therewith, associated contact ring 65', connected socket 75', a socket 77, and through the rectifier 83, magnet 81, and resistance r of a Wheatstone bridge device W, to the right side of the line.

When the perforation, representing a digit in the card column to be compared, is sensed by the upper analyzer, the following circuit is formed:

*Circuit p—Card comparison sensing*

From the left side of the line, through cam contacts T—S (Fig. 1a), common bar 150 of the upper analyzer, the brush UB sensing the perforation, contact plate 147 engaged with the brush UB through the perforation, the connected cable wire 146, socket 145 (Fig. 1b), a plug connection (not shown) to a socket 76 through connected rectifier 82, magnet 80, and resistance r' of a Wheatstone bridge W and to the right side of the line.

If the digit in the card column 19, 20, or 21 is equal to the digit set up in the corresponding order of commutator 56', then the upper brush will sense the card digit at the same time as the emitter E senses the digit set up on commutator 56' and the potential drop across the sides of the corresponding order Wheatstone bridge will be zero and current will not pass through either magnet 80 or 81.

In exactly the same way as described in connection with case 1, energization of magnets 80 and 81, depending on which occurs first, selects magnet 100 or 110 to be energized by circuits $m$ and $n$, when cam contacts CM—3 close after the item sensing period of the tabulating and comparison cycles. Energization of magnet 100 closes contacts 100a to cause a circuit to be formed through magnet 100', when cam contacts C7 close as follows (Fig. 1c):

*Circuit m—2*

From the left side of the line, through contacts C7, plug socket 143, plug wire 113, plug socket 114, and through magnet 100' and contacts 100a to the right side of the line.

Similarly, when magnet 110 has been energized by the comparison of the two values, then contacts 110a are closed and a similar circuit $n$—2 is formed through magnet coil 110'.

Contacts C7 remain closed to the end of the cycle and through the item analyzing period of the next tabulating cycle (see Fig. 4). Consequently, magnet 100' or 110', whichever has been energized, remains energized throughout the item reading period of the next tabulating cycle.

If the comparison is to be made between two fields of the card instead of between one field and a set up or fixed value, then the upper brush sockets 145 of one card field are plugged to sockets 76 while the brush sockets 145 of the other field are plugged to sockets 77. Circuits $p$ will be formed, as traced above, through magnets 80 while similar circuits $p$—1 will be formed through magnets 81. In the same way as before, either magnet 100' or 110' will be energized depending on whether the number in the field associated with sockets 76 is greater or less than the number in the field associated with sockets 77.

Energization of magnet 100' or 110' selectively sets the contacts of comparison selecting device CS, as explained in connection with case 1.

The comparison device CS is set up during the tabulating cycle in which the card from which the comparison is made is passing the upper analyzer. During the next tabulating cycle, the same card is passing through the lower analyzer. The setting of device CS is maintained during the item analyzing period of the latter cycle by continued closure of cam contacts C7. During this latter item analyzing period, then, the comparison-selected accumulator will remain in condition to receive an entry from the same card which during the preceding tabulating cycle controlled the comparison set up.

Three entry problems taken care of by case 2 will be explained.

For the first problem, assume a card has three fields A, B, and C from which entries are to be made, respectively, into Acc. 3, Acc. 4, and Acc. 5. The sockets 51 connected to the lower analyzer contact discs 49 for reading field A are directly connected by a plug connection (not shown) to the sockets 52 of Acc. 3, the sockets 51 related to field B are similarly connected to sockets 52 of Acc. 4, and the sockets 51 related to field C similarly connected to sockets 52 of Acc. 5.

In addition, plug connections 55 of each of Accs. 3, 4, and 5 are removed from sockets 160 and 161 (Fig. 1b) and the latter sockets connected by plug connections (not shown) to device CS to be bridged in accordance with the comparison control and the conditions imposed by the selection of the sockets of device CS to be connected to sockets 160 and 161 of the add and print banks.

Figure 7:
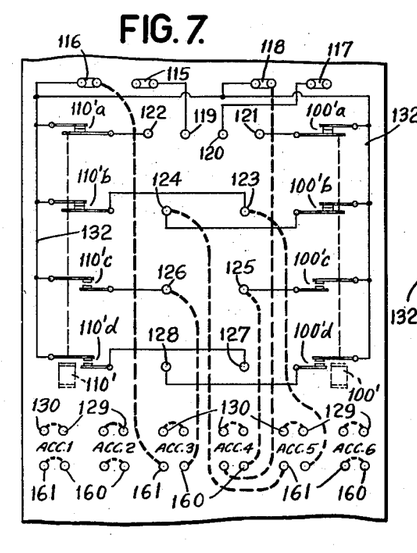
Fig. 7 shows the plugging for controlling entries from cards into entry receiving means in one way.

For instance, assume card fields A and B are to be compared and if item A is greater than item B, it is to be entered into Acc. 3, if item A is less than item B, then item B is to be entered into Acc. 4, and if items A and B are equal, then item C is to be entered into Acc. 5. Accordingly, the values in fields A and B are respectively entered through sockets 76 and 77 (Fig. 1c) into the comparison means; and, as indicated in Fig. 7, sockets 160 and 161 of Acc. 3 are respectively connected to sockets 126 and 116 of device CS, sockets 160 and 161 of Acc. 4 are respectively connected to sockets 125 and 118 of device CS, and sockets 160 and 161 of Acc. 5 are connected, respectively, to sockets 123 and 124 of device CS. Now, if item A is greater than item B, then contacts 110'c will close to complete a bridge across sockets 160 and 161 of Acc. 3; if item B is greater, contacts 100'c will close to complete a bridge across sockets 160 and 161 of Acc. 4; and if items A and B are equal, the bridge between sockets 160 and 161 of Acc. 5 will be completed through contacts 100'b and 110'b both of which remain closed.

In accordance with the comparison, the sockets 160 and 161 of one of the add and print banks will be bridged to condition this bank for receiving an entry from the associated field A, B, or C of the card. The entry into the selected add and print bank will be effected when the lower card analyzer senses a perforation in the card field associated with the selected field to close an entry circuit which is the same as previously traced circuit $g$ except that the plug sockets 160 and 161, instead of being bridged by plug connection 55, are bridged through the comparison device CS.

For the second problem, assume that an entry is to be made from a single card field into one of a plurality of add and print banks in accordance with a comparison of two other fields of the card. For instance, assume the item of card field A is to be entered into Acc. 3 if the value in card field B is greater than that in field C; that item A is to be entered in Acc. 4 if value B is less than value C, and that item A is to be entered in Acc. 5 if values B and C are equal.

Values B and C are entered into the comparison means through sockets 76 and 77. The several orders of sockets 51 of the lower analyzer contact plates 49 for reading field A are plug-connected to the respective corresponding orders of sets of special plug sockets 163, 164, and 165 (Fig. 1b). These sockets are respectively connected to one side of contacts 166a, 167a, and 168a. Sockets 170, 171, and 172 connected to the opposite sides of these contacts are plug connected, respectively, to the corresponding denominational order sockets 52 of Accs. 3, 4, and 5.

Thus, if contacts 166a, 167a, and 168a were all closed, then Accs. 3, 4, and 5 would all be connected to the lower analyzing elements for sensing the single field A to simultaneously receive entries from said field. In order, however, to select only one of the add and print banks to receive entries from field A of a card under comparison control, contacts 166a, 167a, and 168a are initially open and are closed selectively under control of the value comparing means by energization of one of magnets 166, 167, or 168.

Figure 8:
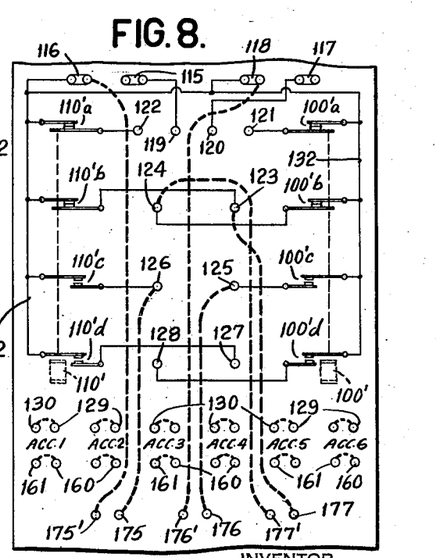
Fig. 8 shows the plugging for controlling a different selective entry.

As indicated in Fig. 1b (at the top), each of magnets 166, 167, and 168 is directly connected to the right side of the line. The connection of magnet 166 to the left side of the line must be made through plug sockets 175 and 175' and a conducting bridge to be formed between them. Similarly, the circuits of magnets 167 and 168 must be completed, respectively, through bridged sockets 176 and 176' and 177 and 177'. To select Acc. 3 to receive value A when a value B is greater than a value C; Acc. 4 to receive value A when value C is greater; and Acc. 5 to receive value A when values B and C are equal, then, as shown in Fig. 8 sockets 175 and 175' are respectively connected to sockets 126 and 116 of device CS, sockets 176 and 176' are respectively connected to sockets 125 and 118 of device CS, and sockets 177 and 177' are respectively connected to sockets 123 and 124 of device CS.

In addition for the second problem, plug connections 55 of add and print banks are reinserted in sockets 160 and 161.

Now, if value B is greater than value C, contacts 110'c will be closed to complete a bridge across sockets 175 and 175'. Consequently, relay magnet 166 will be energized to close all the relay contacts 166a. If value C is greater, contacts 100'c will be closed to close a bridge between sockets 176 and 176' of magnet 167; the latter will be energized to close contacts 167a. If values B and C are equal, contacts 100'b and 110'b will remain closed, magnet 168 will be energized and contacts 168a will be closed.

If contacts 166a close, they select Acc. 3 to receive the entry from card field A, if contacts 167a close, they select Acc. 4 to receive value A, and if contacts 168a close, Acc. 5 is selected to receive value A. The entry circuit is then the same as circuit g, previously traced, except that instead of being completed through a direct plug connection from a socket 51 to a socket 52, it is completed through a plug connection from a socket 51 to a socket 163, 164, or 165, through one of contacts 166a, 167a, or 168a, whichever is closed, and through a plug connection from socket 170, 171, or 172 to a socket 52.

For the third problem assume a card has three fields A, B, and C and that comparison is to be made between the values of two other card fields D and E. In accordance with the comparison, it is desired to enter a value from field A, B, or C into one add and print bank, say Acc. 3.

As for the second problem, sockets 160 and 161 of the add and print banks are plugged across directly by plug connections 55.

Further, the sockets 51 of the lower analyzer elements for card field A are connected to sockets 163, the sockets 51 associated with field B are connected to sockets 164, and the sockets 51 associated with field C are connected to sockets 165. Sockets 170, 171, and 172 are all connected to their corresponding orders of sockets 52 of Acc. 3 only.

It may be desired to enter value A into Acc. 3 when value D is greater than value E, to enter value B into Acc. 3 when value E is greater, and to enter value C into Acc. 3 when values D and E are equal. Plug sockets 175—175', 176—176', and 177—177' are wired to device CS the same as for the second problem.

Now, if value D is greater, contacts 110'c of device CS close, sockets 175 and 175' are bridged, magnet 166 is energized, and contacts 166a are closed. Closing of contacts 166a routes the entry from field A into Acc. 3. If value E is greater, then contacts 100'c close, resulting in energization of magnet 167 and closing of contacts 167a to select field B to enter values into Acc. 3. If value E equals value D, contacts 100'b and 100'c are closed, resulting in energization of magnet 168, closing of contacts 168a, and selection of field C to enter values into Acc. 3.

It is understood that by variously connecting the sockets to be bridged to device CS, different bridging conditions may be provided for the same comparison result, as more fully explained for Case 1.

While entries are being made from one card into the accounting devices, a new comparison is being made on the following card now passing through the upper analyzer. After the item analyzing period of the cycle, cam contacts C7 break, magnet 100' or 110' is deenergized, and cam contacts CM-3 then close to cause energization of magnet 100 or 110 according to the new comparison. During the next cycle, the card from which the new comparison was made passes through the lower analyzer and entries are made therefrom according to the set up of device CS by this comparison.

If it is desired to list or print each item entered into the accumulator bank selected by the comparison, then switches 634 (Fig. 1b) are closed, and the print magnets 135 will be energized differentially at the same time as the add magnets 53 each tabulating cycle, in a manner fully disclosed in Patent 1,762,145.

One bank of print magnets 135 makes a list separate from the list made by another bank of print magnets. Therefore, for the first problem of case 2, an item from field A may be printed in one list by the Acc. 3 printing means, an item of field B may be printed in another list by the Acc. 4 bank, and an item of field C printed in still another list by Acc. 5, the field whose item is to be printed and therefore the bank to which this field is connected being selected by the comparison means. For the second problem, an item from one card field may be printed in one of three different lists in accordance with which add and print bank is selected by the comparison means. For the third problem, a single list will be made by Acc. 3 (or any other desired bank) of items taken from card fields A, B, or C in accordance with the comparison control and selection.

One application of the first problem of case 2 is in inventory accounting. Card fields A, B and C may contain, respectively, the cost of an item, its market value, and its estimated value. Fields A and B may be compared. If the cost is greater than the market value, the cost will be entered into Acc. 3, if the market value is greater, it will be entered in Acc. 4, and if the cost equals the market value, the estimated value may be entered into Acc. 5.

Similarly, for the second problem, if the cost is greater than the market value, entry of the estimated value from field C may be made into Acc. 3, if the market value is greater, the estimated value will be entered into Acc. 4, if the market value and cost are equal, the estimated value will be entered in Acc. 5. Then, at the end of the operation on a group of cards, Acc. 3 will indicate the total of estimated values higher in proportion to the market values than to the costs, Acc. 4 will indicate the total of estimated values higher in proportion to the costs than to the market values, and Acc. 5 will indicate the total of estimated values of the same proportion to costs as to market values.

An application of the third problem is in wage reports. Field A of a card may contain a standard wage value, field B may contain such value plus a bonus value, and field C may contain the standard wage value less a penalty. Fields D and E may respectively contain the actual units of output by an employee and the required units of output. If the actual output is greater, the wage plus bonus item will be entered in Acc. 3 from field B, if the required output is greater, the wage less penalty item will be entered into Acc. 3 from field C, while if the values in fields D and E are equal, the standard wage will be entered into Acc. 3 from field A.

It is to be understood that the invention is not restricted to the forms or embodiments or applications described and shown herein but may take other forms and be varied within the field and spirit of the invention without departing from its principles. It is therefore desired to be limited only by the scope of the following claims.

It is further understood that the term entry receiving device or accounting instrumentality or device or its equivalent as used in the claims is intended to read on any of various accounting devices such as indicators, totalizers, value or total printing or read-out means, and the like common to accounting machines and including a device which is controlled by and in accordance with an item on a card or other value bearing source. Such entry receiving device may be the add magnet 53, the accumulator wheel controlled thereby, the read-out commutator controlled thereby, or the print magnet 135 and such well known printing means as is controlled by the magnet 135 to print the entered item.

What is claimed is:

1. In a machine controlled by successive records, the combination of elements for sensing data representations on a record, entry receiving means, a plurality of means for variably interconnecting said sensing elements and said entry receiving means for effecting entries in said entry receiving means through different entry paths, devices for sensing a pair of control value representations on said record, means controlled by said sensing devices for ascertaining the relative magnitude of said pair of control values, entry selecting means controlled by said ascertaining means in accordance with the relative magnitude of the pair of values and means controlled by said entry selecting means for controlling said interconnecting means to variably route entries into the entry receiving means from the same record from which said pair of control values is derived in accordance with the relative magnitude of said pair of values.

2. In a machine controlled by successive records, the combination of elements for sensing data representations on a record, entry receiving means, a plurality of means for variably interconnecting said sensing elements and said entry receiving means for effecting entries in said entry receiving means through different entry paths, means for sensing a control value represented on said record, a device settable to represent a control value, means controlled by said sensing means and said device for ascertaining the relative magnitude of the pair of control values, entry selecting means controlled by said ascertaining means in accordance with the relative magnitude of said pair of values and means controlled by said entry selecting means for controlling said interconnecting means to variably route entries into the entry receiving means from the same record from which said pair of control values is derived in accordance with the relative magnitude of said pair of values.

3. In a machine controlled by successive records, the combination of elements for sensing data representations on a record, entry receiving means, a plurality of means for variably interconnecting said sensing elements and said entry receiving means for effecting entries in said entry receiving means through different entry paths, means for sensing a control value represented on a record, a device settable to represent a control value, means controlled by said sensing means and said device for ascertaining the relative magnitude of said pair of control values, entry selecting means controlled by said ascertaining means in accordance with the relative magnitude of the pair of control values, and means controlled by said entry selecting means for controlling said interconnecting means to variably route entries into the entry receiving means from the record sensed by said sensing elements in accordance with the relative magnitude of said pair of values.

4. In a machine controlled by successive records, the combination of elements for sensing data representations on a record, entry receiving means, a plurality of means for variably interconnecting said sensing elements and said entry receiving means for effecting entries in said entry receiving means through different entry paths, devices for sensing a pair of control value representations on a record, means controlled by said sensing devices for ascertaining the relative magnitude of said pair of control values, entry selecting means controlled by said ascertaining means in accordance with the relative magnitude of the pair of values and means controlled by said entry selecting means for controlling said interconnecting means to variably route entries into the entry receiving means from the record sensed by said elements in accordance with the relative magnitude of said pair of values.

5. In a machine controlled by successive records, the combination of means for sensing data representations on a single field of a record, a plurality of entry receiving devices, a plurality of means for variably connecting said sensing means with any one of said entry receiving devices, sensing devices for sensing a pair of control value representations on a record, means controlled by said sensing devices for ascertaining the relative magnitude of said pair of control values, entry selecting means controlled by said ascertaining means in accordance with the relative magnitude of the pair of values, and means controlled by said entry selecting means for controlling the aforesaid connecting means to variably route data entry from said record field into a predetermined entry receiving device in accordance with the relative magnitude of said pair of values.

6. In a machine controlled by successive records, the combination of means for sensing data representations on a single field of a record, a plurality of entry receiving devices, a plurality of means for variably connecting said sensing means with any one of said entry receiving devices, means for sensing a control value represented on a record, a device settable to represent a control value, means controlled by said sensing means and said settable device for ascertaining the relative magnitude of said pair of control values, entry selecting means controlled by said ascertaining means in accordance with the relative magnitude of said pair of values, and means controlled by said entry selecting means for controlling said connecting means to variably route data entry from said record field into a predetermined entry receiving device in accordance with the relative magnitude of said pair of values.

7. In a machine controlled by successive records, the combination of elements for sensing data representations on a plurality of fields of a record, an entry receiving device, a plurality of means for variably connecting said entry receiving device with the sensing elements of any one of said record fields, sensing devices for sensing a pair of control value representations on a record, means controlled by said sensing devices for ascertaining the relative magnitude of said pair of control values, entry selecting means controlled by said ascertaining means in accordance with the relative magnitude of the pair of values, and means controlled by said entry selecting means for controlling said connecting means to variably route data entry into said entry receiving device from a predetermined one of said record fields in accordance with the relative magnitude of said pair of values.

8. In a machine controlled by successive records, the combination of elements for sensing data representations on a plurality of fields of a record, an entry receiving device, a plurality of means for variably connecting said entry receiving device with the sensing elements of any one of said record fields, means for sensing a control value represented on a record, a device settable to represent a control value, means controlled by said sensing means and said settable device for ascertaining the relative magnitude of said pair of control values, entry selecting means controlled by said ascertaining means in accordance with the relative magnitude of said pair of values, and means controlled by said entry selecting means for controlling said connecting means to variably route data entry into said entry receiving device from a predetermined one of said record fields in accordance with the relative magnitude of said pair of values.

9. In an accounting machine; the subcombination comprising a Wheatstone bridge device including between its opposite sides a pair of parallel magnets and rectifiers for permitting current in one direction only to flow through one of the magnets and current in the opposite direction only to flow through the other magnet, means for entering differentially timed electrical impulses representing a pair of values into the opposite sides of the Wheatstone bridge device and connected to the bridge device for causing a current flow in one direction upon the entering of one value-representing impulse and to provide a current flow in the opposite direction upon the entering of the other value-representing impulse whereby each of said magnets is energized singly upon non-simultaneous occurrence of the current flows and neither is energized upon simultaneous occurrence of said opposite flows, a set of relays operated under control of each magnet when energized, a pair of devices, each controlled by operation of one set of relays as a manifestation that one differentially timed impulse represents a greater value than that represented by the other impulse and means in each set of relays for preventing operation of the other set of relays according to the order in which the differentially timed impulses are entered in the Wheatstone bridge device.

JAMES W. BRYCE.